United States Patent

Bergmans et al.

Patent Number: 6,118,833
Date of Patent: Sep. 12, 2000

[54] FAST ACQUISITION METHOD FOR OBTAINING DATA FROM A TRANSMISSION CHANNEL AND A DATA RECEIVER FOR CARRYING OUT THIS METHOD

[75] Inventors: Johannes W. M. Bergmans; Ho W. Wong-Lam; Johannes O. Voorman, all of Eindhoven, Netherlands

[73] Assignee: U.S. Philips Corporation, New York, N.Y.

[21] Appl. No.: 08/919,051

[22] Filed: Aug. 27, 1997

[30] Foreign Application Priority Data

Sep. 2, 1996 [EP] European Pat. Off. ............. 96202426

[51] Int. Cl.[7] ......................................................... H04L 7/00
[52] U.S. Cl. ........................... 375/366; 375/232; 375/345
[58] Field of Search .................... 375/366, 364, 375/365, 362; 370/509, 511, 514; 369/59

[56] References Cited

U.S. PATENT DOCUMENTS

| | | | |
|---|---|---|---|
| 4,353,130 | 10/1982 | Carasso et al. | 375/365 |
| 4,754,450 | 6/1988 | Lynk, Jr. et al. | 370/280 |
| 5,212,690 | 5/1993 | Low | 370/514 |
| 5,347,548 | 9/1994 | Messerges et al. | 375/371 |
| 5,719,843 | 2/1998 | Nakajima et al. | 369/59 |

OTHER PUBLICATIONS

SSI 32P4904 Read Channel IC. pp. 5–335 to 5–377 of the 1995 data book of silicon systems, Inc., Tustin, CA USA.

"Timing Recovery for Adaptive Decision Feedback Equalization of the Magnetic Storage Channel" by W.L. Abbott and J.M. Cioffi, in Proc., Globecom '90 pp. 1794–1799, San Diego, CA, Dec. 2–5.

"A PRML System for Digital Magnetic Recording", by R.D. Cideciyan, et al. in IEEE J. Selected Areas Communications, vol. SAC–10, No. 1, pp. 38–56, Jan. 1992.

*Primary Examiner*—Don N. Vo
*Assistant Examiner*—Phuong Phu
*Attorney, Agent, or Firm*—Edward W. Goodman

[57] ABSTRACT

A fast acquisition method is described that combines timing, gain and, if required, equalizer acquisition in one go with word synchronization. At the heart of the method is a preamble that begins with a repetition of identical words P whose length matches the code-word length. Preferably the method ends with a frame-sync word based on the bit-by-bit inverse of P. Main attractions of the technique are simplicity, speed, and robustness.

16 Claims, 2 Drawing Sheets

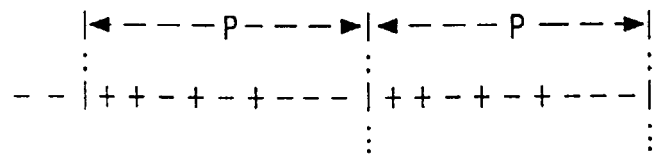
FIG. 4a
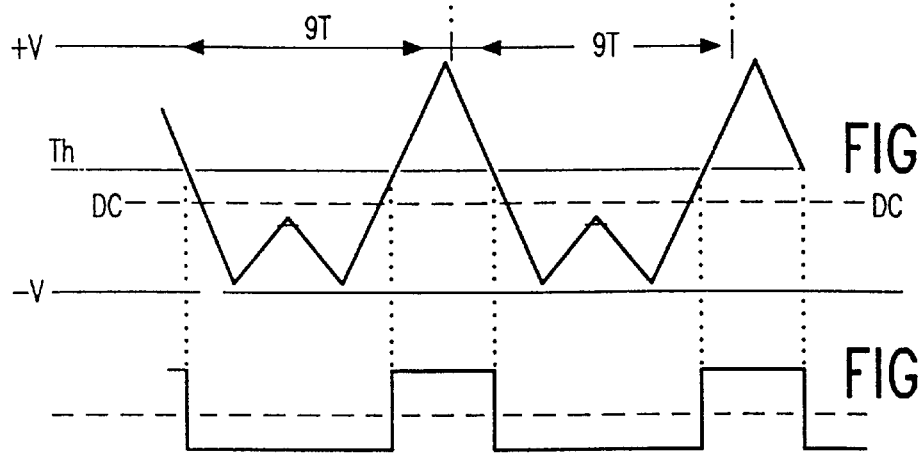
FIG. 4b
FIG. 4c
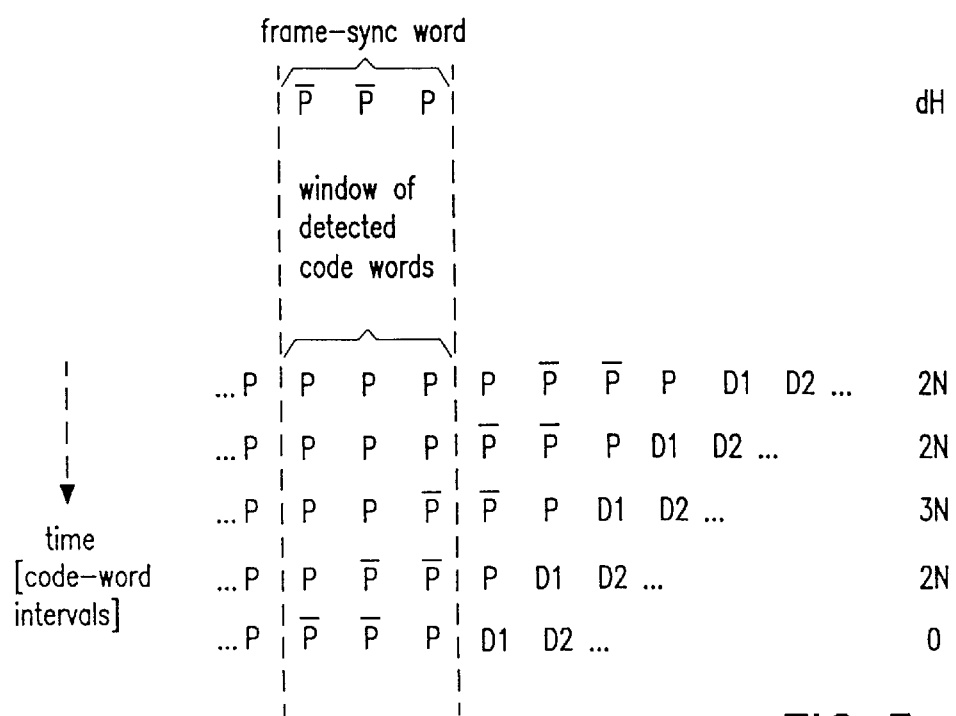
FIG. 5

FAST ACQUISITION METHOD FOR OBTAINING DATA FROM A TRANSMISSION CHANNEL AND A DATA RECEIVER FOR CARRYING OUT THIS METHOD

BACKGROUND OF THE INVENTION

1. Field of the Invention

This invention relates to a fast acquisition method for obtaining data from a transmission channel, and, in particular, for use in hard disk drives or in burst-mode radio communication systems, comprising the steps of timing acquisition; gain acquisition and word synchronization by means of a preamble that comprises a predetermined bit format, this preamble being followed by N-bit user data words.

2. Description of Related Art

Such a method is known from the documentation of the SSI 32P4904 Read Channel IC, that is disclosed on the pages 5-335 to 5-377 of the 1995 data book of Silicon Systems, Inc., Tustin, Calif., USA.

In hard disk drives, user data is subdivided into fixed-length blocks that are stored in separate sectors. Data blocks are encoded prior to storage, so as to facilitate reliable detection, and are preceded by a predefined preamble that permits the read path to prepare itself for reception of the user data. This preparation is commonly called fast acquisition, and generally comprises the following tasks:
1. locking the read clock to the incoming data stream; this is generally called the timing acquisition;
2. initialization of the gain of the AGC; the so-called gain acquisition;
3. initialization of the adaptive parameters of the equalizer, the equalizer acquisition, this initialization sometimes can be omitted when the parameters of the equalizer are pre-programmed;
4. identification of the boundaries of code-words, the word synchronization;
5. identification of the start of the user data portion of the sector, i.e., the frame synchronization.

The structure of the preamble reflects the order in which these tasks are dealt with. A typical structure is depicted in FIG. 1, this figure corresponding with FIG. 11 on page 5-348 of the above mentioned documentation of Silicon Systems.

The preamble commences with the pattern ". . . ++−+−++. . . " of period 4T where T is the temporal spacing of recorded bits. This pattern induces a sine-like replay signal that conveys considerable timing and gain information. As is described in the article "Timing recovery for adaptive decision Feedback Equalization of the Magnetic Storage Channel," by W. L. Abbott and J. M. Cioffi, in Proc. GLOBECOM'90, pp. 1794–1799, San Diego, Calif., Dec. 2–5, 1990, or in the article 11A PRML System for Digital Magnetic Recording 11, by R. D. Cideciyan, et al., in IEEE J. Selected Areas Communications, Vol. SAC-10, No. 1, pp. 38–56, January, 1992, prior knowledge about this pattern and signal can be exploited for rapid timing and gain acquisition. Techniques of this type are generally data-aided, i.e., they are tailored to the pattern at hand and cease to function properly when another pattern is recorded. Near the end of the 4T pattern it is, for this reason, necessary for the timing recovery and gain-control loops to switch to a decision-directed tracking mode. In this mode, prior knowledge about the recorded data is replaced by posterior knowledge based on decisions produced by the detector. As long as these decisions are predominantly correct, both loops will properly track the timing and gain of the replay signal. At the end of the 4T portion of the preamble, the AGC is set properly and the timing recovery scheme is phase-locked to the 4T pattern.

The next step in the acquisition method is word synchronization. This step is based on a predefined data pattern that is compared every symbol interval T with a window of detected bits. Word synchronization is established once an adequate match between these two patterns is observed. Modern hard disk drives often use a modulation code with rate R=8/9, so that code-words have a length of 9T. The word-sync pattern in FIG. 1 has a period 9T and is just a repetition of a single predefined code-word. This code word is selected to be able to adequately distinguish the proper code-word alignment from the eight alternative alignments and, moreover, to permit acquisition of a slope equalizer. Such an equalizer is often used in recording systems because the bandwidth of the head/media system is not accurately known beforehand. The equalizer compensates, in essence, for spectral unbalances between low and high frequencies and a suitable training pattern must have at least two spectral components within the pass-band of the head/media system. The 4T pattern cannot qualify because it has only one such component.

At the end of the 9T pattern, the only task left is frame synchronization. In FIG. 1 this is accomplished with a single predefined code-word that differs sufficiently from the preceding 9T words. The frame sync check can be based on the input of the modulation decoder, but also -at some loss of Hamming distance- on its byte-wise output. It needs only be performed every byte-interval, i.e., every 9T seconds, and is, as such, much less computationally intensive than the word sync check, which is performed at the bit rate 1/T.

It should be mentioned that there are many variants of the above method. For example, the tasks of word and frame synchronization can be combined at the cost of a longer sync word and more complicated synchronization hardware, as, for example, is described in the above mentioned article of W. L. Abbott and J. F. Cioffi. The equalizer training pattern can then follow the sync word and is no longer restricted in period and length. This is important if the equalizer has multiple "knobs". In some cases, the equalizer has too many knobs to permit training prior to every data read operation. In these cases, equalizer coefficients are normally trained once during disk drive manufacturing, and are pre-loaded ever after. This frees the preamble from a pattern for equalizer training. The other 4 tasks are invariably encountered in modern channel ICs. For the sake of completeness, it is worth mentioning that frame synchronization was accomplished outside the channel IC in past generations of hard disc drives, notably for channel ICs with (1, 7) or (2, 7) run-length-limited code.

To a larger or smaller extent, existing acquisition methods all share the following characteristics and disadvantages:
1. They are largely serial in nature, i.e., the various tasks are largely accomplished consecutively. This complicates hardware and lengthens acquisition-times.
2. Several of the involved steps (e.g., equalizer acquisition, word and frame synchronization) occur in a decision-directed mode, and are sensitive to decision errors.

SUMMARY OF THE INVENTION

The invention aims to overcome or at least mitigate the disadvantages of the known fast acquisition methods and to, this effect provides a method of the above-mentioned type, characterized in that the steps of timing acquisition, gain acquisition and word synchronization are carried out simultaneously by using a multiple of a submultiple of N. This includes N being a preamble comprising a series of predetermined, identical n-bit words, wherein n is a multiple of N, or a sub-multiple of N or a multiple of a sub-multiple of N or n=N.

Preferably, the method also comprises frame synchronization by means of an N-bit frame synchronization word that forms part of the preamble and which, according to an embodiment, is the bit-by-bit inverse of the n-bit word, when n=N.

When, for example N=9, then n can be, for example 3, a sub-multiple of N; 6, a multiple of a sub-multiple of N; 9 n=N; or 18, a multiple of N.

The invention is based on the insight that the complexity of existing acquisition methods is largely rooted in the word synchronization step, this step being unavoidable if the first portion of the preamble has a period that does not match the code-word length. The inventive idea on which the new method is based, is to avoid such a portion. The preamble is a repetition of identical words P whose length matches the code-word length. An example of the sector format for the method according to the invention is shown in FIG. 2. The timing-recovery scheme is locked to the preamble so that the time-base is established modulo the code-word length. This means that word synchronization is an automatic by-product of the timing acquisition.

A practical problem is that the timing-recovery loop may "hand up" at an undesired phase relative to the preamble. A proper choice of P will mitigate this problem. Also, it is generally desirable for the initial phase to be sufficiently close to the desired one so as to prevent the timing-recovery loop from ever entering a "hang-up zone". This is, according to a further aspect of the invention, possible, for example, by means of a zero-phase start technique.

Apart from timing acquisition, the preamble is also used for gain acquisition. The preamble generally has two or more spectral components in the pass-band of the head/media system and is, for this reason, also suitable for acquisition of a slope equalizer. A remaining acquisition step, for which preferably also the preamble is used, is frame synchronization. To this end, the acquisition method must first revert from a data-aided to a decision-directed mode, after which, a frame-sync word is to be identified. As is shown in FIG. 2, the frame-sync word $\overline{P}$ preferably is just the bit-by-bit inverse of P. Frame sync is declared as soon as the detected code-word A is more similar to $\overline{P}$ than to P. This decision process is simple because it occurs at the code-word rate and, more importantly, because of the simple relation between P and $\overline{P}$. Moreover, since P and $\overline{P}$ have the largest possible Hamming distance, the detection process is also as reliable as possible for a given code-word length.

Main advantages of the method according to the invention are:
1. Simplicity: Word synchronization and acquisition of timing, gain and equalizer occur in one go rather than in multiple steps. Frame synchronization, if provided for in the preamble, takes place at the code-word rate and is simple.
2. Speed: All acquisition steps occur in parallel rather than sequentially. Reliable frame synchronization, if provided for in the preamble, is possible with a very short sync word.
3. Robustness. All acquisition steps are performed in a data-aided fashion and are, hence, immune to decision errors. For the adopted sync-word length, frame synchronization is maximally tolerant to decision errors. Further improvements to error tolerance are simple.

The invention also relates to an apparatus, more in particularly a data receiver, for carrying out the method according to the invention, comprising a voltage-controlled oscillator providing a bit clock and an n-bit clock, an automatic gain control circuit; a bit detector and a modulation decoder, characterized by a preamble generator for applying a predetermined preamble of a series of n-bit words during a certain period to an input of the bit detector, means for determining said period, and an adaptation circuit for controlling the voltage controlled oscillator and the automatic gain control circuit, the adaptation circuit receiving, at least as an input signal, an error signal.

Preferably, the means for determining said period applies an activation signal to the frame sync detector after said period.

Finally, the invention relates to a method for writing data on a hard disk, wherein N-bit user data words data are stored in sectors on the hard disc, each block of user data being preceded by a preamble having a fixed format, characterized in that the preamble comprises a series of predetermined, identical n-bit words, wherein n is a multiple or a submultiple of N or n=N.

BRIEF DESCRIPTION OF THE DRAWINGS

A data receiver according to the invention now will be described with respect to a preferred embodiment, referring to the drawings, in which:

FIGS. 4a–4c shows illustrations of the zero-start procedure; and

FIG. 5 shows the Hamming distance properties of an enhanced frame-sync procedure according to the invention.

DETAILED DESCRIPTION OF THE PREFERRED EMBODIMENTS

Figure 1:
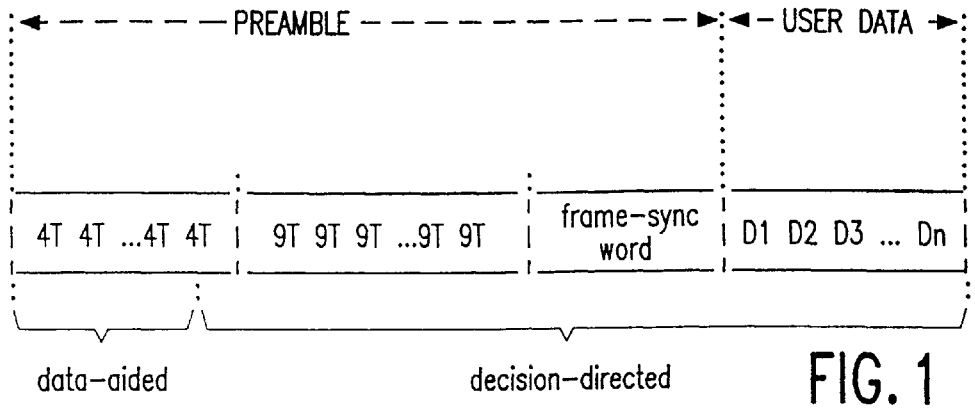
FIG. 1 shows a sector format for fast acquisition according to the prior art.
Figure 2:
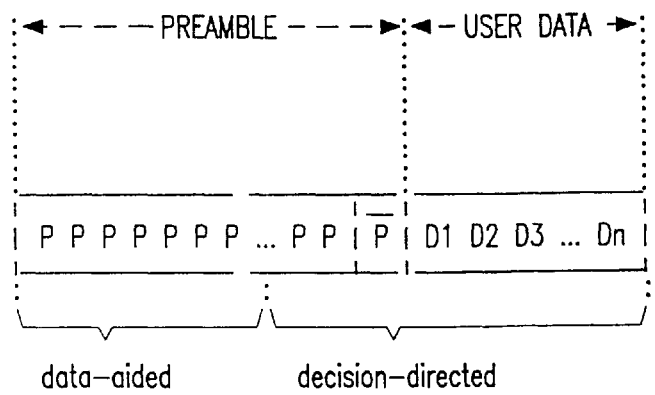
FIG. 2 shows a sector format for fast acquisition according to the present invention.
Figure 3:
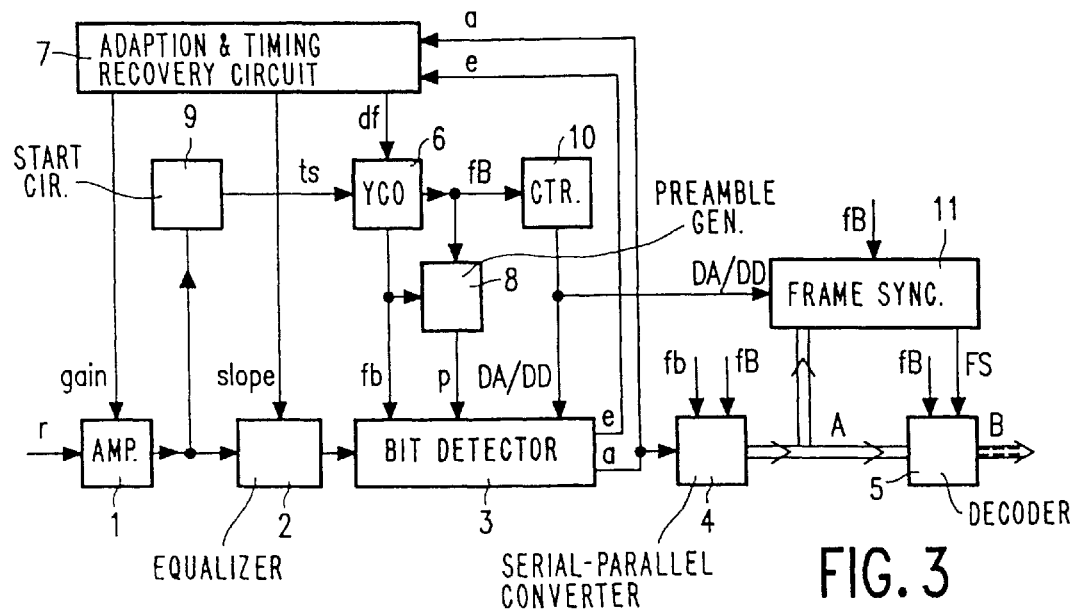
FIG. 3 shows a block diagram of a data receiver for carrying out the method according to the invention.

In the data receiver of FIG. 3, during "normal" operation when user data are received, a replay signal r, that is read from a hard disc or that is received from any transmission channel, is applied to a bit-detector 3 via a variable-gain amplifier 1 and a slope equalizer 2. Bit-decisions a leave the bit-detector serially, and are converted into 9-bit words A by means of a serial-to-parallel converter 4. These words A, in turn, are decoded into user data bytes B by means of a modulation decoder 5.

In addition to bit-decisions a, the bit-detector 3 also produces an error signal e that serves, along with a, as a basis for adaptation and timing recovery in an adaptation and timing recovery circuit 7. In the "normal" decision-directed (DD) mode, the signal e is determined by the difference between the input of a slicer forming part of the bit detector 3, and the output thereof. The gain and slope control loops, through the adaptation and timing recovery circuit 7, are closed via the variable-gain amplifier 1 and the slope equalizer 2, respectively, while the timing-recovery loop is closed via a voltage-controlled oscillator 6. This oscillator produces a bit clock $f_b$ (nominally equal to 1/T) which paces the bit-detector 3, as well as a byte clock $f_B$ (nominally equal to 1/(9T)) which paces the serial-to-parallel converter 4 and the modulation decoder 5.

A necessary condition for all control loops to function properly is that bit errors are rare. At the start of the acquisition method, this is by no means guaranteed and, for this reason the detector also has a data-aided (DA) mode in which bit-decisions can be "imposed". The imposed bits p serve as the bit-detector output (i.e. a=p), and are also used as a basis for the error signal e, which, in the DA mode, is determined by the difference between preamble signals as received at the input to the slicer and the signal p. Acquisition begins when the head is reading the first portion of the preamble. The underlying bit pattern . . . PPP . . . =$P_0P_1P_2$ . . . $P_8P_0P_1$ . . . of period 9T is produced by a preamble generator 8 and constitutes the imposed bit sequence p. If p is properly aligned with the incoming read signal, then all control loops will converge and, after some time, the detector can safely switch to a decision-directed (DD) mode of operation.

Small misalignments will not affect reliable convergence, but if the misalignment is a large fraction of the preamble period (i.e., of 9T) then control loops may "hang up" or even misconverge. To avoid this anomaly, preferably, a zero-phase start circuit 9 is used to establish a "safe" initial alignment. The zero-phase start process is illustrated in FIGS. 4a–4c for a typical preamble P=$p_0$ . . . $P_8$=++–+–+–, as shown in FIG. 4a. The magnetic recording channel is differentiating in nature, i.e., it basically responds to transitions in the recorded data. The "largest" transition (––++) occurs at the boundaries of preamble words and yields a large positive peak. The other transitions are all significantly smaller and yield significantly smaller signal excursions. This heuristic argumentation explains the basic shape of the replay signal in FIG. 4b.

In the zero-phase start circuit 9, two peak detectors are used to detect the positive and negative peaks V+ and V− of the replay signal, and a detection threshold Th is located halfway between them. The signal is compared to this threshold Th by means of a slicer, that is provided for in the zero-phase start circuit 9. The slicer output signal, which is shown in FIG. 4c, is binary and has one upgoing and one downgoing transition every 9T seconds. Either of these transitions can be used, after a properly chosen fixed delay, as a start signal $t_s$ for the voltage-controlled oscillator 6 and the preamble generator 8. In practice, it may be desirable to precede the zero-phase start circuit 9 by a pre-filter or, equivalently, to connect it to the equalizer output or to an interior equalizer signal, in order to suppress noise.

Accounting for variations of head, media and integrated circuit parameters, as well as for noise, this technique permits initial misalignments below approximately T or 1.5 T seconds, which is good enough for reliable convergence. By way of comparison, it is worth mentioning that zero-phase start circuits as used in conventional acquisition methods, are generally required to produce initial misalignments of a fraction of T seconds. In this regard the present approach is much more tolerant to various imperfections, and much more suited for use at high data rates.

The first bit produced by the preamble generator after zero-phase start has a well-defined position relative to the code-word boundaries, and this prior knowledge permits the serial-to-parallel converter 4 to be initialized in such a manner that the boundaries of successive outputs A coincide with the code-word boundaries (i.e., A =P). Thus, word synchronization is automatically established immediately after zero-phase start.

Reliable convergence of all loops occurs basically within a fixed period from the zero-phase start moment, depending on the adopted loop gains. At the end of this period, as determined by a byte counter 10, the bit-detector 3 is switched from data-aided (DA) to decision-directed (DD), and a frame-sync detector 11 is activated. The modulation decoder, by means of a signal Fs, is started as soon as the frame-sync word $\overline{P}$ is detected.

Channel IC's for magnetic recording systems are normally polarity-insensitive, i.e., they function properly irrespective of a possible polarity-reversal in the write amplifier/write head/media/read head/read amplifier chain. The acquisition method described above does not have this property, i.e., it will fail if polarity of the read signal is incorrect relative to that of the locally generated data p. To overcome this problem, the polarity of the replay signal may be detected at the time of disk manufacturing based on the duty cycle of the slicer output in FIGS. 4a–4c. Alternatively, both possible polarities can be tried out and only the correct one will appear to function properly. A detected polarity reversal can then be corrected by a programmable reversal before the bit-detector.

The single-word frame-sync technique as described above will work properly as long as more than half of all bits of each detected code-word is correct throughout the decision-directed portion of the preamble. For a code-word length N=9, this means that, at most, four decision errors can be tolerated in each word, which is likely to be adequate in most applications. In systems with a small value of N (such as recording systems with run-length-limited codes of the (1,7) type, for which N=3), the error tolerance may be smaller than desirable.

Improvement of the tolerance to decision errors requires that the Hamming distance $d_H$ between the frame-sync word and detected code-words be increased. This requires a frame-sync word that spans multiple code-word. By way of illustration, consider the frame-sync word W=$\overline{P}\overline{P}$ P of length 3N. Each byte interval, i.e., every N symbol intervals, this word is compared with a window of 3 detected code-words, i.e. of 3N detected bits, and frame sync is declared if and only if at least half of the detected bits agrees with the corresponding bits of W. For erroneous alignments, the Hamming distance $d_H$ between this window and the sync word is at least 2N, twice as much as for the single-word procedure, as is schematically shown in FIG. 5. The incremental information that is collected every code-word interval involves merely a comparison of a single detected code-word A with P (or, equivalently, with $\overline{P}$). Complexity of the "enhanced" frame-synchronization procedure is, therefore, not much larger than that of the single-word procedure.

Enlargement of $d_H$ beyond 2N is possible at the cost of a further increment or the length of W. For example, the Barker sequence W=$\overline{P}\overline{P}\overline{P}$ P $\overline{P}$ yields a Hamming distance 3N. In all cases, it remains possible and attractive for W to be fully made up of P and $\overline{P}$.

Optimization of the acquisition method involves, among other issues, a careful choice of the word P that underlies the preamble. This word affects, for example, the amount of control information that becomes available to various control loops, as well as the tolerance of the method to misalignment errors produced by zero-phase start circuit.

In the examples above, the period of the first part of the preamble equals the code-word length N. It is also possible for this period to be a multiple or sub-multiple of N. This can be attractive when N is much smaller or larger than the value N=9 considered above, and it also permits additional desiderata to be achieved. For example, the preamble P $\overline{P}$ P $\overline{P}$ P $\overline{P}$ . . . P $\overline{P}$ P $\overline{P}$ P $\overline{P}$ period 2N can be used as the basis of a polarity-insensitive method.

We claim:

1. A fast acquisition method for obtaining data from a transmission channel comprising the steps:

timing acquisition;

gain acquisition; and word synchronization using a preamble that comprises a predetermined bit format, said preamble being followed by N-bit user data words, characterized in that the steps of timing acquisition, gain acquisition and word synchronization are carried out simultaneously using a preamble comprising a series of predetermined, identical n-bit words, wherein n is a multiple of N, or a sub-multiple of N, or a multiple of a sub-multiple of N, or n=N.

2. The method as claimed in claim 1, wherein said method further comprises the step of equalizer acquisition, characterized in that the equalizer acquisition step is performed, using the preamble, simultaneously with the timing acquisition, gain acquisition and word synchronization steps.

3. The method as claimed in claim 1, characterized in that the method further comprises the step:

initially aligning the preamble with a locally generated, identical preamble using a zero-phase start circuit which starts an oscillator that controls the timing of the steps of the method.

4. The method as claimed in claim 1, wherein the method further comprises the step of frame synchronization, characterized in that the preamble further comprises at least one N-bit frame synchronization word following the series of predetermined, identical n-bit words.

5. The method as claimed in claim 4, characterized in that n=N, and the preamble comprises one N-bit frame synchronization word, said one N-bit frame synchronization word being the bit-by-bit inverse of one of the predetermined, identical n-bit words.

6. The method as claimed in claim 5, characterized in that the method further comprises the step:

initially aligning the preamble with a locally generated, identical preamble using a zero-phase start circuit which starts an oscillator that controls the timing of the steps of the method.

7. The method as claimed in claim 4, wherein said method further comprises the step of equalizer acquisition, characterized in that the equalizer acquisition step is performed, using the preamble, simultaneously with the timing acquisition, gain acquisition and word synchronization steps.

8. The method as claimed in claim 7, characterized in that the method further comprises the step:

initially aligning the preamble with a locally generated, identical preamble using a zero-phase start circuit which starts an oscillator that controls the timing of the steps of the method.

9. An apparatus for obtaining data from a transmission channel, said apparatus comprising:

a voltage-controlled oscillator for providing a bit clock and a n-bit clock;

an automatic gain control circuit coupled to receive the data from the transmission channel;

a bit detector coupled to an output of the automatic gain control circuit, said bit detector having a first output for supplying a bit-detection signal and a second output for supplying an error signal;

a modulation decoder coupled to the first output of the bit detector for receiving the bit-detection signal, said modulation decoder supplying the obtained data;

a preamble generator, coupled to an output of said voltage-controlled oscillator, for applying a predetermined preamble having a series of n-bit words during a certain period to an input of the bit detector;

means, coupled to the output of said voltage-controlled oscillator and to an input of said bit detector, for determining said certain period; and an adaptation circuit for controlling the voltage-controlled oscillator and the automatic gain control circuit, said adaptation circuit being coupled to the second output of the bit detector for receiving said error signal as an input.

10. The apparatus as claimed in claim 9, characterized in that said apparatus further comprises an equalizer circuit coupled between said automatic gain control circuit and said bit detector, said equalizer circuit receiving a control signal from said adaptation circuit.

11. The apparatus as claimed in claim 10, characterized in that said apparatus further comprises a zero-phase start circuit, coupled to the output of the automatic gain control circuit, for providing a binary output signal with transitions at predetermined moments, the output of the zero-phase start circuit being coupled to the voltage-controlled oscillator.

12. The apparatus as claimed in claim 9, characterized in that said apparatus further comprises a zero-phase start circuit, coupled to the output of the automatic gain control circuit, for providing a binary output signal with transitions at predetermined moments, the output of the zero-phase start circuit being coupled to the voltage-controlled oscillator.

13. The apparatus as claimed in claim 9, characterized in that said apparatus further comprises a frame sync detector coupled to the first output of said bit detector, said frame sync detector applying a start signal to said modulation decoder when a frame sync word is detected, wherein said means for determining said certain period applies an activation signal to the frame sync detector after said certain period.

14. The apparatus as claimed in claim 13, characterized in that the frame sync detector activates the modulation decoder as soon as frame synchronization is effected.

15. The apparatus as claimed in claim 14, characterized in that said apparatus further comprises a zero-phase start circuit, coupled to the output of the automatic gain control circuit, for providing a binary output signal with transitions at predetermined moments, the output of the zero-phase start circuit being coupled to the voltage-controlled oscillator.

16. The apparatus as claimed in claim 13, characterized in that said apparatus further comprises a zero-phase start circuit, coupled to the output of the automatic gain control circuit, for providing a binary output signal with transitions at predetermined moments, the output of the zero-phase start circuit being coupled to the voltage-controlled oscillator.

* * * * *